United States Patent
Shen et al.

(10) Patent No.: US 11,851,051 B2
(45) Date of Patent: Dec. 26, 2023

(54) SYSTEM AND METHOD FOR DETECTING AN OBJECT IN A TURNING ALERT ZONE OF A VEHICLE

(71) Applicant: Toyota Motor Engineering & Manufacturing North America, Inc., Plano, TX (US)

(72) Inventors: Mingher Fred Shen, Ann Arbor, MI (US); Salem BenSalem, Lansing, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 219 days.

(21) Appl. No.: 17/386,783

(22) Filed: Jul. 28, 2021

(65) Prior Publication Data

US 2023/0031096 A1    Feb. 2, 2023

(51) Int. Cl.
*B60W 30/09* (2012.01)
*B60W 30/095* (2012.01)
*B60W 50/14* (2020.01)

(52) U.S. Cl.
CPC .......... *B60W 30/09* (2013.01); *B60W 30/095* (2013.01); *B60W 50/14* (2013.01); *B60W 2050/143* (2013.01); *B60W 2420/42* (2013.01); *B60W 2554/4041* (2020.02); *B60W 2554/4044* (2020.02); *B60W 2554/4049* (2020.02)

(58) Field of Classification Search
CPC .... B60W 30/09; B60W 30/095; B60W 50/14; B60W 2050/143; B60W 2420/42
See application file for complete search history.

(56) References Cited

U.S. PATENT DOCUMENTS

| | | | |
|---|---|---|---|
| 9,335,163 B2 | 5/2016 | Lavoie | |
| 9,487,139 B1* | 11/2016 | Ishida | B60W 50/16 |
| 10,358,088 B1* | 7/2019 | Pertsel | H04N 7/181 |
| 10,427,679 B2* | 10/2019 | Van Dan Elzen | B60W 50/14 |
| 2010/0030473 A1* | 2/2010 | Au | G06V 20/56 |
| | | | 701/28 |

(Continued)

FOREIGN PATENT DOCUMENTS

| | | | |
|---|---|---|---|
| CN | 1041419694 A | 11/2014 | |
| WO | WO-2017132278 A1 * | 8/2017 | G06K 9/00805 |

*Primary Examiner* — Hussein Elchanti
*Assistant Examiner* — Kenneth M Dunne
(74) *Attorney, Agent, or Firm* — Christopher G. Darrow; Darrow Mustafa PC (57) ABSTRACT

A system for controlling operation of a vehicle during a turning maneuver includes an object detection sensor, a vehicle turning angle sensor, and a processor. A memory is communicably coupled to the processor and stores a turning alert zone module configured to determine if a speed of the vehicle is within a predetermined range of speeds and, if the speed of the vehicle is within the predetermined range of speeds, determine if a vehicle turning angle is above a predetermined threshold value. If the turning angle is above the predetermined threshold value, and using the turning angle, a turning alert zone is determined. The system may then determine if at least a portion of an object resides in the turning alert zone and, if at least a portion of an object resides in the turning alert zone, control an operation of the vehicle (for example, a braking operation).

21 Claims, 4 Drawing Sheets

(56) References Cited

U.S. PATENT DOCUMENTS

| | | | |
|---|---|---|---|
| 2013/0110372 A1* | 5/2013 | Groult | B62D 15/029 |
| | | | 701/70 |
| 2017/0101056 A1* | 4/2017 | Park | G08G 1/166 |
| 2017/0210282 A1* | 7/2017 | Rodriguez Barros | G03B 17/54 |
| 2017/0363728 A1* | 12/2017 | Prasad | G01S 13/88 |
| 2018/0067307 A1* | 3/2018 | Liubakka | G06F 3/14 |
| 2019/0315373 A1* | 10/2019 | Kondo | B60W 30/095 |
| 2020/0307640 A1* | 10/2020 | Tsuji | G05D 1/0268 |
| 2021/0197807 A1* | 7/2021 | Park | B60W 30/09 |
| 2022/0396313 A1* | 12/2022 | Ryne | B62D 15/0255 |

* cited by examiner

SYSTEM AND METHOD FOR DETECTING AN OBJECT IN A TURNING ALERT ZONE OF A VEHICLE

TECHNICAL FIELD

The present disclosure generally relates to convenience and alert systems for vehicles, more particularly, to alert systems that are able to detect objects that may be located within a path of a turning of a vehicle.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Many vehicles include blind spot monitoring (BSM) systems and intelligent clearance sonar (ICS) as convenience features. BSM may use various sensors in the vehicle to detect oncoming traffic generally around a rear area of the subject vehicle. ICS may generally be used for parking assistance, as well as for protection of the front and rear ends of a vehicle. Neither BSM nor ICS technology takes into account the unique circumstances when a vehicle is turning, or approaching a turning maneuver in the near future. This may be especially significant, for both object and pedestrian avoidance, if a vehicle has a long wheelbase.

Accordingly, it would be desirable to provide an improved alert notification system for informing vehicle operators of objects that may potentially be in a blind spot region of a moving vehicle, thus providing improved alert coverage that cannot be provided by convention BSM or ICS type systems.

SUMMARY

In one aspect of the embodiments described herein, a system for controlling operation of a vehicle is provided. The system may include an object detection sensor, a vehicle turning angle sensor, and a processor. The system may also include a memory communicably coupled to the processor and storing a turning alert zone module including computer-readable instructions that, when executed by the processor, cause the processor to perform certain functions. Included may be instructions to determine if a speed of the vehicle is within a predetermined range of speeds and, if the speed of the vehicle is within the predetermined range of speeds, determine if a vehicle turning angle is above a predetermined threshold value. Also included may be instructions to, if the turning angle is above the predetermined threshold value, and using the turning angle, determine a turning alert zone. Also included may be instructions to determine if at least a portion of an object resides in the turning alert zone and, if at least a portion of an object resides in the turning alert zone, control an operation of the vehicle.

In another aspect of the embodiments described herein, a method for controlling operation of a vehicle during a turning operation of the vehicle. The method includes steps of determining that a speed of the vehicle is within a predetermined range of speeds, and determining that a vehicle turning angle is above a predetermined threshold value. The method also includes a step of, using the turning angle, determining a turning alert zone. The method also includes a step of determining that at least a portion of an object resides in the turning alert zone. The method also includes a step of, responsive to at least a portion of an object residing in the turning alert zone, controlling operation of the vehicle in a manner directed to preventing a collision between the vehicle and the object.

In yet another aspect of the embodiments described herein, a non-transitory computer readable medium is provided for controlling operation of a vehicle during a turning operation of the vehicle. The computer readable medium stores instructions that when executed by one or more processors cause the one or more processors to determine that a speed of the vehicle is within a predetermined range of speeds. Also included may be instructions to determine that a vehicle turning angle is above a predetermined threshold value and to, using the turning angle, determine a first turning alert zone. Also included may be instructions to determine that at least a portion of an object resides in the first turning alert zone and, responsive to at least a portion of an object residing in the first turning alert zone, control operation of the vehicle in a manner in a manner directed to preventing a collision between the vehicle and the object.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Embodiments described herein include a system for controlling operation of a vehicle during a turning maneuver includes an object detection sensor, a vehicle turning angle sensor, and a processor. A memory is communicably coupled to the processor and stores a turning alert zone module configured to determine if a speed of the vehicle is within a predetermined range of speeds and, if the speed of the vehicle is within the predetermined range of speeds, determine if a vehicle turning angle is above a predetermined threshold value. If the turning angle is above the predetermined threshold value, and using the turning angle, a turning alert zone is determined. The system may then determine if at least a portion of an object resides in the turning alert zone and, if at least a portion of an object resides in the turning alert zone, control an operation of the vehicle (for example, a braking operation designed to prevent the vehicle from colliding with the object residing in the turning alert zone).

As used herein, to "determine" or "determining" a dimension or a value of a parameter means that the various modules, components, and systems (e.g., turning alert zone module 117) of the vehicle 100 are capable of detecting or calculating the dimension or parameter value with a degree of accuracy and/or certainty great enough to enable performance of the operations, evaluations, and functions described herein.

Figure 1:
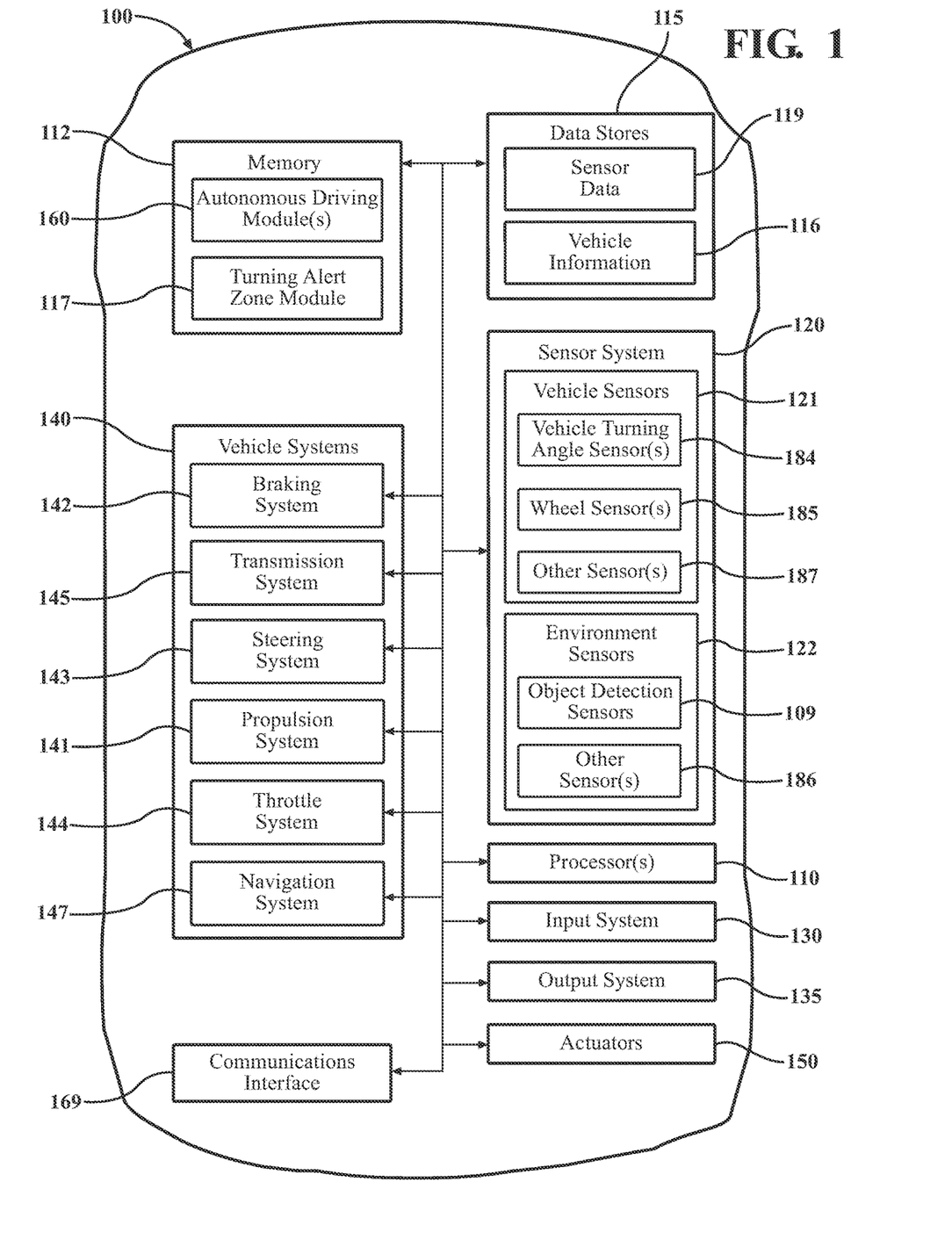
FIG. 1 is a schematic view of a vehicle incorporating a system for controlling one or more operations of a vehicle during a turning operation of the vehicle, in accordance with embodiments described herein.

Referring to FIG. 1, an example of a vehicle 100 is illustrated. As used herein, a "vehicle" is any form of motorized transport. In one or more implementations, the vehicle 100 is conventionally-powered or hybrid passenger vehicle. While arrangements will be described herein with respect to passenger vehicles, it will be understood that embodiments are not limited to passenger vehicles. In some implementations, the vehicle 100 may be any form of motorized transport that benefits from the functionality discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100.

Some of the possible elements of the vehicle 100 are shown in FIG. 1 and will be described with reference thereto. Additionally, it will be appreciated that for simplicity and clarity of illustration, where appropriate, reference numerals may have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

FIG. 1 shows a block schematic diagram of a vehicle 100 incorporating an embodiment of a system for controlling one or more operations of a vehicle engaged in a turning maneuver, and responsive to a determination that at least a portion of an object resides in a turning alert zone of the vehicle. In some instances, the vehicle 100 may be configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that can operate in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one or more arrangements, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along the travel route.

The vehicle 100 can include one or more processor(s) 110. In one or more arrangements, the processor(s) 110 can be a main processor(s) of the vehicle 100. For instance, the processor(s) 110 can be an electronic control unit (ECU). The vehicle 100 can include one or more data stores 115 for storing one or more types of data. The data store(s) 115 can include volatile and/or non-volatile memory. Examples of suitable data store(s) 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 115 can be a component of the processor(s) 110, or the data store(s) 115 can be operably connected to the processor(s) 110 for use thereby. The term "operably connected," as used throughout this description, can include direct or indirect connections, including connections without direct physical contact.

The one or more data store(s) 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more object detection sensor(s) 109 of the sensor system 120.

The one or more data store(s) 115 can include vehicle information 116. The vehicle information 116 can include any information relating to the vehicle 100 which enables and/or facilitates operation of the object detection sensor(s) 109, the turning alert zone module 117 and/or any other component or system of the vehicle, in performance of any of the functions and operations described herein. For example, vehicle information 116 may include information relating to the physical geometry of the exterior of the vehicle 100, spatial coordinates of particular portions of the vehicle expressed in terms of a reference coordinate system or a reference location on the vehicle, locations and/or boundaries of reference features defined in terms of vehicle parameters (e.g., wheelbase length L1, the location of the vehicle fore-aft plane FA1, front wheel width W1 and rear wheel width W2 when the wheels are in loaded conditions for a given vehicle weight, etc.), and other pertinent information. Information relating to various characteristics of the vehicle may be programmed and/or stored in vehicle information 116 in data stores 115 and/or in the turning alert zone module 117.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor(s) to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operably connected to the processor(s) 110, the data store(s) 115, and/or another element of the vehicle 100 (including any of the elements shown in FIG. 1). The sensor system can acquire data of the vehicle occupant compartment, such as the number and positions of occupants, whether or not an occupant is out of position, detection of living objects, and other data described herein. The sensor system 120 can also acquire data of at least a portion of the external environment of the vehicle 100 (e.g., nearby objects).

The sensor system 120 can include any suitable type of sensor. Various examples of different types of sensors will be described herein. However, it will be understood that the embodiments are not limited to the particular sensors described or to the particular sensors shown in FIG. 1. The example sensors may be part of the one or more environment sensors 122 and/or the one or more vehicle sensors 121. The sensor system 120 may include any sensors suitable for and/or required to perform any of the data acquisition and/or vehicle control operations contemplated herein.

Sensors of sensor system 120 may be communicably coupled to the various systems and components of the vehicle 100. The sensors may be operably connected to the vehicle wireless communications interface 169 for transmission of information to a cloud or other storage facility. The sensors may also be operably connected to other vehicle systems and components, such as data stores 115 and processor(s) 110, for storage and processing of vehicle and environmental sensor data. Sensor system 120 may include sensors configured to detect the current state or status of vehicle systems and components and to generate indications (for example, using trouble codes) possible malfunctions of vehicle systems and components.

The sensor system 120 can include one or more vehicle sensors 121. The vehicle sensor(s) 121 can detect, determine, and/or sense information about the vehicle 100 itself and/or any occupants inside the vehicle. In one or more arrangements, the vehicle sensor(s) 121 can be configured to detect events and conditions in the vehicle occupant compartment. The occupant compartment or interior of the vehicle may comprise the enclosure in which the vehicle seats are located and/or in which vehicle occupants reside during travel in the vehicle.

In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100, such as the current geographical location of the vehicle. In one or more arrangements, the vehicle sensor(s) 121 can include a speedometer to determine a current speed and acceleration/deceleration of the vehicle 100. The vehicle sensor(s) 121 may include vehicle directional sensors (not shown) configured to determine a current heading of the vehicle or direction in which the vehicle is pointed.

In one or more arrangements, the vehicle sensor(s) 121 may include wheel sensors 185 configured to detect or determine locations of one or more of an inside front wheel center plane FWCP of any front wheel and/or an inside front wheel face plane FWFP of any front wheel during turning of the front wheel, with respect to a reference feature of the vehicle. The wheel sensors 185 may also be configured to detect or determine locations of one or more of an inside rear wheel center plane RWCP and/or an inside rear wheel face plane RWFP of any rear wheel, with respect to a reference feature of the vehicle.

The vehicle sensor(s) 121 may include vehicle turning angle sensor(s) 184. The vehicle turning angle sensor(s) 184 may be any sensor(s) configured to determine the vehicle turning angle $\theta$ or to acquire data usable by the turning zone alert module 117 or another element/system of the vehicle to calculate or otherwise determine the vehicle turning angle.

In addition, the sensor system 120 can include one or more environment sensors 122 configured to acquire, and/or sense driving environment data. "Driving environment data" includes data or information about the external environment in which the vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, weather conditions, etc. As an example, in one or more arrangements, the environment sensors 122 can include one or more radar sensors, one or more LIDAR sensors, one or more sonar sensors, and/or one or more cameras (not shown).

The vehicle sensor(s) 121 may include object detection sensor(s) 109. The object detection sensors may be specified and positioned on the vehicle so as to have defined detection envelopes or fields of view including a turning alert zone ZZ determined as described herein. The object detection sensor(s) 109 may be configured to detect any object exterior of the vehicle and residing in the vehicle turning alert zone. The object detection sensor(s) 109 may be configured to detect both moving and static objects, including features of the terrain (such as curbs and foliage) close to the vehicle that may be in the path of the vehicle 100 during the turn.

The object detection sensor(s) 109 may be configured to (or the turning alert zone module 117 may be configured to process sensor data to) distinguish between different types of objects, between living and non-living objects, and between different types of living objects (for example, between people and animals). The object detection sensor(s) 109 may be configured to (or the turning alert zone module 117 may be configured to process sensor data to) determine that all or a portion of any detected object resides inside a turning alert zone.

The vehicle wireless communications interface 169 may be configured to enable and/or facilitate communication between the components and systems of the vehicle and entities (such as cloud facilities, cellular and other mobile communications devices, other vehicles, etc.) exterior of the vehicle. For example, an alert caused by operation of the turning alert zone module 117 (described in greater detail below) may be transmitted to an off-vehicle person or facility via the wireless communications interface 169.

The vehicle 100 can include an input system 130. An "input system" includes any device, component, system, element or arrangement or groups thereof that enable information/data to be entered into a machine. For example, the input system 130 may include a keypad, a touch screen or other interactive display, a voice-recognition system and/or any other device or system which facilitates communications between a user and the vehicle. The input system 130 can receive an input from a vehicle occupant (e.g., a driver or a passenger) or a user located remotely from the vehicle 100. In particular embodiments, the input system 130 may include buttons and/or switches enabling a user to stop or start the vehicle simply by actuating the buttons/switches. The vehicle 100 can also include an output system 135. An "output system" includes any device, component, or arrangement or groups thereof that enable information/data to be presented to a vehicle occupant (e.g., a driver, a vehicle passenger, etc.) or a remote user. In particular arrangements, the output system may include speakers or other devices configured to convey sounds or other alerts generated by the output system to an exterior of the vehicle.

In one or more arrangements, the input system 130 may be configured to enable a human user to generate and/or select one or more customized alerts to be directed to a person who is determined to reside in a turning alert zone ZZ of the vehicle 100. The input system 130 may be configured to enable user control of the characteristics of generated alerts, for example, the form, content, and volume of the alert.

The vehicle 100 can include one or more vehicle systems, collectively designated 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle systems 140 can include a propulsion system 141, a braking system 142, a steering system 143, throttle system 144, a transmission system 145, and/or a navigation system 147. Each of these systems can include one or more devices, components, and/or a combination thereof, now known or later developed.

The propulsion system 141 may include an engine (not shown) of the vehicle. The engine may be an internal combustion engine in a conventionally-powered vehicle, an internal combustion engine or an electric motor in a Hybrid electric-petroleum vehicle, or an electric motor in a fully electrically-powered vehicle, for example. The engine may be turned on in a conventional manner by activation of an ignition switch. In one or more arrangements, the ignition switch may be configured to be activatable by a human driver or vehicle occupant. In certain embodiments, the ignition switch may be configured to be turned "on" or "off" autonomously by a command from processor(s) 110 under instructions from one of the modules, such as autonomous driving module(s) 160.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system. The navigation system 147 may be configured to track the path of a vehicle along a travel route. The navigation system 147 may be configured to operate in conjunction with the autonomous driving module to guide the vehicle along a travel route selected by a user.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160 and/or the turning alert zone module 117. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by processor(s) 110, implement one or more of the various processes described herein. One or more of the modules can be a component of the processor(s) 110, or one or more of the modules can be executed on and/or distributed among other processing systems to which the processor(s) 110 is operably connected. The modules can include instructions (e.g., program logic) executable by one or more processor(s) 110. Alternatively, or in addition, one or more of data store(s) 115 may contain such instructions.

Generally, a module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. The autonomous driving module(s) 160 can determine position and velocity of the vehicle 100. The autonomous driving module(s) 160 can determine the location of obstacles and/or other environmental features including traffic signs, trees, shrubs, neighboring vehicles, pedestrians, etc. The autonomous driving module(s) 160 can be configured to receive, and/or determine location information for obstacles within the external environment of the vehicle 100 for use by the processor(s) 110 and/or by one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 can be configured to determine travel path(s), current autonomous driving maneuvers for the vehicle 100, future autonomous driving maneuvers and/or modifications to current autonomous driving maneuvers based on data acquired by the sensor system 120 and/or information received from a navigation system, such as navigation system 147. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, force, compel, direct, command, instruct, and/or enable an event or action to occur or at least be in a state where such event or action may occur, either in a direct or indirect manner.

The autonomous driving module(s) 160 can be configured to execute various vehicle functions and/or to transmit data to, receive data from, interact with, and/or control the vehicle 100 or one or more systems thereof (e.g., one or more of vehicle systems 140). The autonomous driving module(s) 160 may be configured to autonomously control the vehicle so as to drive the vehicle along a travel route, from an initial or start location to a destination.

The processor(s) 110, the turning alert zone module 117, and/or the autonomous driving module(s) 160 described herein can be operably connected to communicate with the other elements of the vehicle, including the various vehicle systems 140 and/or individual components thereof. For example, returning to FIG. 1, the processor(s) 110, the turning alert zone module 117 and/or the autonomous driving module(s) 160 can be in communication to send and/or receive information from the various vehicle systems 140 to control the movement, speed, maneuvering, heading, direction, etc. of the vehicle 100. The processor(s) 110, the turning alert zone module 117 and/or the autonomous driving module(s) 160 may control some or all of these vehicle systems 140 and, thus, may be partially or fully autonomous.

The processor(s) 110, the turning alert zone module 117, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110 and/or the autonomous driving module(s) 160 can control the direction and/or speed of the vehicle 100. The processor(s) and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels).

In one or more arrangements, a system for controlling operation of a vehicle as described herein may include a turning alert zone module 117. The turning alert zone module 117 can be configured to receive data from one or more sensors of the sensor system 120 and/or any other type of system capable of capturing information relating to the vehicle 100. The turning alert zone module 117 may include computer-readable instructions that, when executed by the processor(s) 110, cause the processor(s) to use sensor data and/or other information to make determinations and perform (or cause performance of) operations as described herein. The vehicle 100 may include any and all sensors, mechanisms, systems (in the form of software and/or hardware), etc., needed for the turning alert zone module 117 to detect conditions and/or events and to make determinations based on the considerations and using the information described herein and any other available information.

The turning alert zone module 117 may include computer-readable instructions that, when executed by the processor(s) 110, cause the processor(s) to activate, deactivate, and/or otherwise control vehicle components and/or systems and aspects of vehicle operation as described herein, responsive to information acquired by the vehicle sensors and/or the occurrence of other conditions and events. The turning alert zone module 117 may be configured to operate in conjunction with the autonomous driving module(s) 160 and/or any other vehicle component and/or system to control any operations of the vehicle 100 as described herein.

Figure 2:
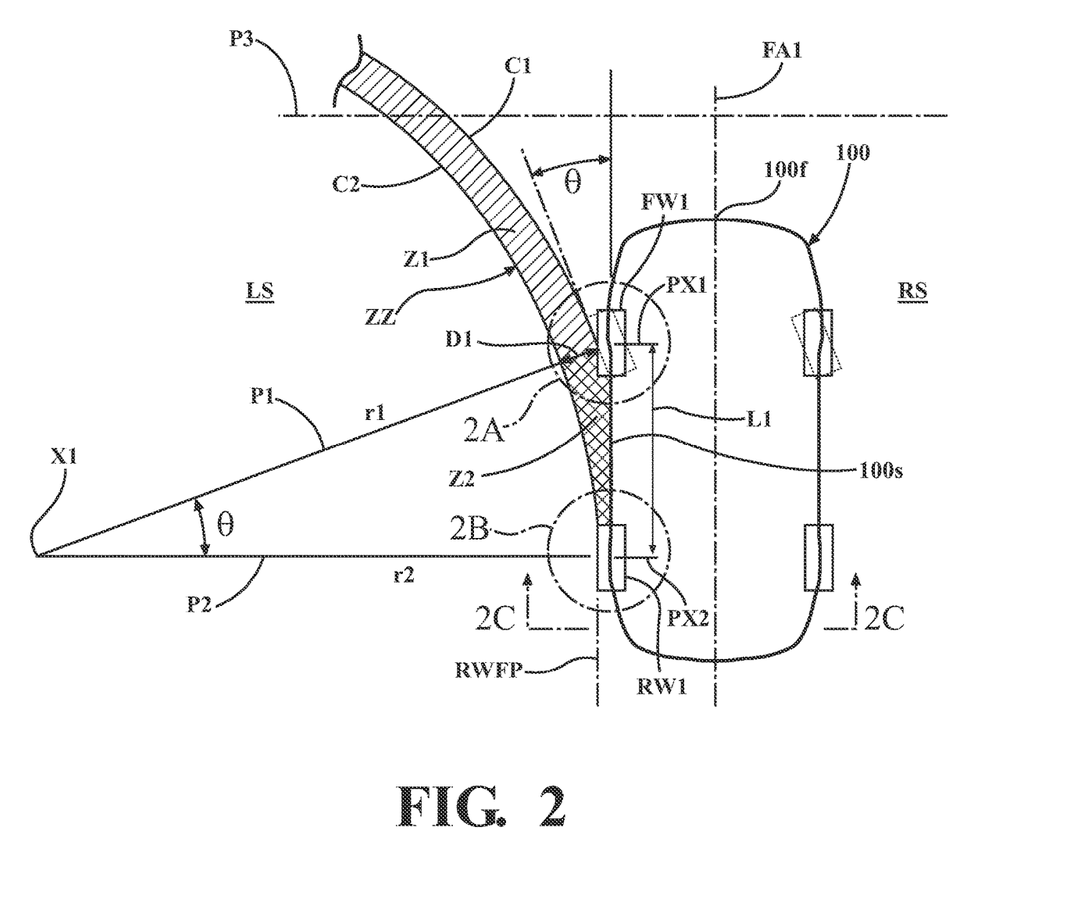
FIG. 2 is a schematic plan view of a vehicle during a turning operation and showing projected paths of positions of the vehicle based on the vehicle configuration and a current turning angle of the vehicle.

FIG. 2 is a schematic plan view of a vehicle 100 in the process of turning toward a left side LS of the vehicle. Although definitions may be set forth herein in terms of the left-turning vehicle of FIG. 2, it will be understood that these definitions also apply to a vehicle turning toward the right side RS of the vehicle. Referring to FIGS. 2-2C, a turning side of the vehicle may be the side (i.e., left side LS or right side RS) toward which the vehicle is turning. A fore-aft plane FA1 of the vehicle may be a vertical plane extending along a length or longitudinal dimension of the vehicle and bisecting or substantially bisecting the vehicle. An inside front wheel FW1 may be the front wheel residing on the turning side of the vehicle. An inside rear RW1 wheel may be a rear wheel residing on the turning side of the vehicle.

Figure 2A:
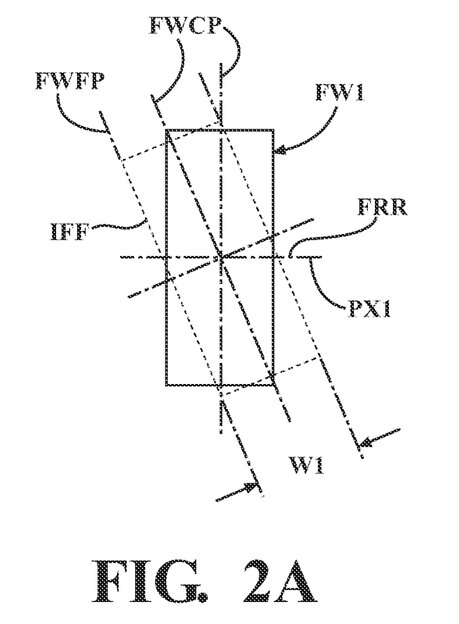
FIG. 2A is a magnified schematic view of a portion of the view of FIG. 2, illustrating further aspects of the vehicle front wheel.
Figure 2B:
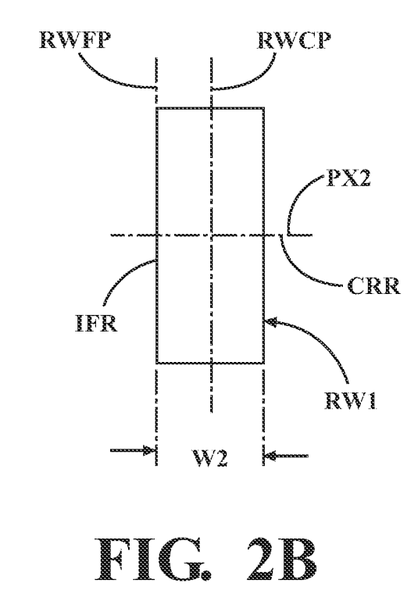
FIG. 2B is a magnified schematic view of a portion of the view of FIG. 2, illustrating further aspects of the vehicle rear wheel.
Figure 2C:
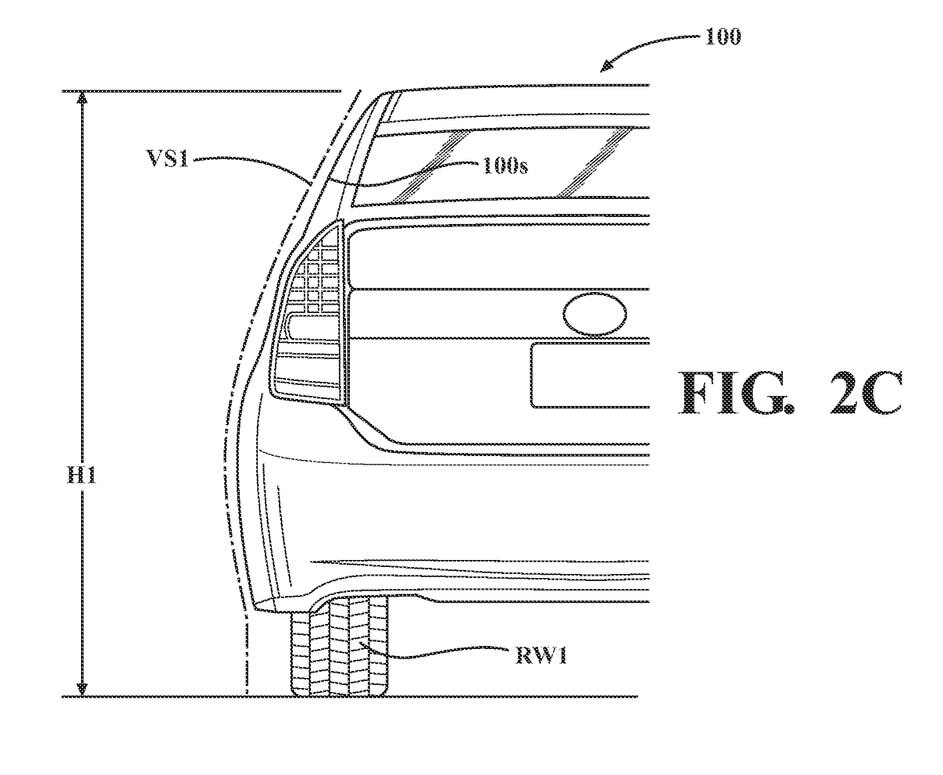
FIG. 2C is a schematic rear view of the vehicle shown in FIG. 2, showing a side portion of the vehicle defining a boundary of a turning alert zone of the vehicle during a turn.

Referring to FIGS. 2 and 2A, an inside front wheel center plane FWCP may be a vertical plane bisecting the inside front wheel FW1 along a width dimension W1 of the inside front wheel. An inside front wheel face plane FWFP may be a vertical plane extending parallel to the inside front wheel center plane FWCP and along an inside face IFF of the inside front wheel (i.e., a side of the wheel facing in the turning direction). Referring to FIGS. 2 and 2B, an inside rear wheel center plane RWCP may be a vertical plane bisecting the inside rear wheel along a width dimension W2 of the inside rear wheel. An inside rear wheel face plane RWFP may be a vertical plane extending parallel to the inside rear wheel center plane RWCP and along an inside face IFR of the inside rear wheel (i.e., a side of the rear wheel facing in the turning direction).

A wheelbase distance L1 of the vehicle 100 may be a shortest horizontal distance between a first vertical plane PX1 extending perpendicular to the inside front wheel center plane FWCP and along a rotational axis of the inside front wheel FW1 when the turning angle θ is 0°, and a second vertical plane PX2 extending perpendicular to the inside rear wheel center plane RWCP and along a rotational axis of the inside rear wheel RW1 when the turning angle θ is 0°.

A turning angle θ of the vehicle may be an angle between the fore-aft plane FA1 of the vehicle and the inside front wheel face plane FWFP. The angle may be 0° when the inside front wheel face plane FWFP is parallel to fore-aft plane FA1 (i.e., when the vehicle front wheels are pointed straight ahead) and non-zero when the inside front wheel face plane FWFP is not parallel to fore-aft plane FA1 (i.e., when the front wheels are turned in either direction). The current or existing turning angle θ may be the turning angle at any given moment that the angle is measured or determined. A current turning angle may be a turning angle detected by a wheel sensor or other suitably configured sensor, or it may be calculated by the processor(s) 110 under control of the turning alert zone module 117 or another module using sensor data.

The vehicle characteristics and parameters described herein may be used to define a turning alert zone ZZ of the vehicle 100. The turning alert zone ZZ may be a volume of space which at least a portion of the vehicle 100 may pass through during a turn, based on the turning angle of the front wheels, the length of the vehicle, and the estimated paths of the vehicle wheels during the turn. The exterior of the vehicle including this volume of space may be scanned by sensors for objects residing in the zone ZZ, to aid in preventing collisions between the vehicle 100 and such objects.

The turning alert zone may be defined when the vehicle turning angle reaches or exceeds a value (in any of the left or right directions) above a predetermined threshold angle and when the vehicle speed is within a predetermined range of speeds. In particular arrangements, the predetermined threshold angle is 2° and the predetermined range of speeds is 1-15 mph. Assigning a predetermined threshold angle as a prerequisite for operation by the turning alert zone module to determine the alert zone allows for slight variations in turning angle as a user makes slight steering adjustments during driving of the vehicle along a straight roadway. Also, the allowable speed of the vehicle 100 during a turning maneuver may be restricted due to, for example, considerations of occupant comfort and vehicle stability. The maximum speed at which the turn is performed may depend on the location of the vehicle center of mass, the space available for the turn, and other factors. Thus, the turning alert zone module 117 may be configured to operate as described herein only when the vehicle speed is within the predetermined range of speeds. The range of speeds allowable during turning of the vehicle may be determined by analysis and/or experimentation for a vehicle whose weight and center of mass will not change appreciably during use. For a vehicle whose weight and center of mass may change appreciably do to varying loading conditions, the allowable range of turning speeds may be determined dynamically and algorithmically using suitable formulas combined with vehicle sensor data. Alternatively, a fixed range of allowable turning speeds may be selected for implementation by the turning alert zone module 117. The fixed speed range may incorporate a suitable safety factor designed to ensure vehicle safety and stability during turning maneuvers in view of anticipated variations in vehicle weight, location of center of mass, etc.

Because a finite time period is required to turn the vehicle front wheels and because the rate of turning may be limited by considerations of occupant comfort and vehicle stability, the current turning angle θ will vary during the turn, beginning at a value below the predetermined threshold angle and ending at some final value required to make the required turn in the space available at a given speed. The turning angle θ may vary due to actions of a human driver or the turning angle may be calculated and controlled by the autonomous driving module 160 as part of implementing an autonomous turning maneuver which is to be performed by the vehicle 100.

In one or more particular arrangements, the turning alert zone module 117 may be configured to determine a turning alert zone ZZ by defining a first turning alert sub-zone Z1 and a second turning alert sub-zone Z2 contiguous with the first turning alert sub-zone Z1, and combining the first and second turning alert sub-zones into the single turning alert zone ZZ. Contiguous first and second turning alert sub-zones Z1 and Z2 may be determined or defined as described herein. Taken in combination, the first and second turning alert sub-zones Z1, Z2 may define the turning alert zone ZZ. The turning alert zone ZZ may be monitored by sensor system 120 for the presence of an object or a portion of an object therein. In one or more particular arrangements, each of the first and second turning alert sub-zones Z1, Z2 may be monitored individually by sensor system 120 for the presence of an object or a portion of an object therein.

Referring to FIG. 2, a first boundary plane P1 may be a vertical plane extending perpendicular to the inside front wheel face plane FWFP and through the axis of rotation FRR of the inside front wheel when the turning angle θ is non-zero. A second boundary plane P2 may be a vertical plane extending perpendicular to the inside rear wheel face plane RWFP and through the center of rotation CRR of the inside rear wheel RW1. As seen in FIG. 2, when the turning angle θ is non-zero, the first and second boundary planes P1, P2 may intersect to form a line or axis X1. A distance r1 may be a shortest horizontal distance along the first boundary plane P1 from the axis X1 to the inside front wheel face plane FWFP when then inside front wheel is turned at the turning angle θ. A distance r2 may be a shortest horizontal distance along the second boundary plane P1 from the axis X1 to the inside rear wheel face plane RWFP.

A first turning alert sub-zone Z1 may be defined along the turning side of the vehicle as shown in FIG. 2. The first turning alert sub-zone Z1 may be bounded by a portion of a first circular cylinder C1 having a radius of r1 and extending between the first boundary plane P1 and a vertical forward plane P3 extending perpendicular to the vehicle fore-aft axis FA1, at a distance r1 from the forward-most portion 100f of the vehicle 100. The first turning alert sub-zone Z1 may also be bounded by a portion of a second circular cylinder C2 having a radius of r2 and extending between the first boundary plane P1 and the forward plane P3. The second circular cylinder C2 may be radially spaced apart a distance D1 from the first circular cylinder C1. Referring to FIG. 2, the spacing distance D1 may be determined using the following relationships:

$$\tan\theta = \frac{L1}{r2} \Rightarrow r2 = \frac{L1}{\tan\theta} \quad (1)$$

$$\sin\theta = \frac{L1}{r1} \Rightarrow r1 = \frac{L1}{\sin\theta}$$

$$\text{So } D1 = r1 - r2 = \frac{L1}{\sin\theta} - \frac{L1}{\tan\theta}$$

$$D1 = L1\left(\frac{1}{\sin\theta} - \frac{1}{\tan\theta}\right)$$

A second turning alert sub-zone Z2 may also be defined along the turning side of the vehicle as shown in FIG. 2. The second turning alert sub-zone Z2 may be bounded by a portion of the first circular cylinder C1 extending between the first boundary plane P1 and the second boundary plane P2. The second turning alert sub-zone Z2 may also be bounded by a plane VS1 (FIG. 2C) including side surfaces 100s of the vehicle 100 residing along the turning side, and extending from a ground surface GS on which the vehicle 100 resides, up to a predetermined height H1 (e.g., a height of the vehicle) above the ground surface. As seen in FIG. 2, the second turning alert sub-zone Z2 may also be bounded by a portion of the turning inside front wheel FW1 extending between the side surfaces 100s of the vehicle 100 and the first boundary plane P1. The second turning alert sub-zone Z2 may also be bounded by the first and second boundary planes P1, P2. The second turning alert sub-zone Z2 may essentially reside between the centers of rotation of the front and rear inside wheels FW1 and RW1 and may describe a "blind spot" of the vehicle 100 during turning which may not be normally monitored by vehicle sensors, but which is monitored by the sensor system 120 of the present invention.

The exact boundary locations and dimensions of the turning alert sub-zones Z1, Z2 may depend on such factors as the current turning angle θ and the location at which the turn begins (i.e., a location along the path of the vehicle where the turning angle first exceeds the predetermined threshold value). The turning alert zone module 117 may be configured to digitally construct the above-described reference planes, the turning alert zone ZZ (including the first and second turning alert sub-zones Z1 and Z2) and other features for reference and calculation for any given position of the vehicle in terms of spatial coordinates in the environment of the vehicle, using known vehicle parameters (such as the geometry of the turning side of the vehicle, a position of the forward-most portion of the vehicle, the wheelbase length L1, known fields of view of the environment sensors in relation to portions of the vehicle, etc.), sensor data (for example, the turning angle θ), and/or other pertinent information.

The turning alert zone module 117 may be configured to relate object detection sensor data (including the locations of entire detected objects and portions of detected objects) to the boundaries of the current turning alert zone as determined by the turning alert zone module 117, to determine if all or a portion of any detected objects reside in the turning alert zone. Because the boundaries and dimensions of the turning alert sub-zones may change as the vehicle progresses through a turn, the turning alert zone module 117 described herein may be configured to repeatedly redetermine the turning alert sub-zone Z1, Z2 and zone boundaries and dimensions during the periods leading into and during the turn, based on the current turning angle and while the turning angle θ is above the predetermined threshold angle. As the turning alert zone boundaries are updated during changes in the turning angle as the vehicle 100 progresses through the turn, objects or portions of objects that were outside a previous iteration of the turning alert zone ZZ may be detected within the boundaries of the current, updated turning alert zone. Thus, the turning alert zone module 117 may be configured to cycle through the calculations and determinations relating to the turning alert sub-zone and zone boundaries and dimensions as rapidly as possible during the vehicle turning process, to ensure that the turning alert sub-zone and zone boundaries and dimensions are as up-to-date as possible. At the same time, the object detection sensors may continuously scan the vehicle environment during the turn to ensure that any pertinent object residing in the latest turning alert zone ZZ is detected as soon as possible to provide the maximum reaction time for braking the vehicle or controlling other aspects of vehicle operation.

In one or more arrangements, the turning alert zone module 117 may include computer-readable instructions that, when executed by the processor(s) 110, cause the processor(s) to determine if a speed of the vehicle is within the predetermined range of speeds. If the vehicle speed is not within the predetermined range of speeds, it may be assumed that the vehicle is not attempting to turn, for purposes of whether or not to determine the turning alert zone ZZ.

The turning alert zone module 117 may also be configured to, if the speed of the vehicle is within the predetermined range of speeds, determine if the turning angle of the vehicle is above the predetermined threshold value. If the turning angle of the vehicle is not above the predetermined threshold value, it may be assumed that the vehicle is not attempting to turn, for purposes of whether or not to determine the turning alert zone ZZ.

The turning alert zone module 117 may also be configured to, if the turning angle is above the predetermined threshold value, and using the turning angle, determine a turning alert zone of the vehicle. The turning alert zone module 117 may be configured to then determine that at least a portion of an object resides in the turning alert zone. The turning alert zone module 117 may also be configured to, responsive to at least a portion of an object residing in the turning alert zone, control operation of the vehicle in a manner directed to preventing a collision between the vehicle and the object.

Controlling an operation of the vehicle 100 may include controlling operation of some portion of the vehicle to perform a specific task or function. Control of some operations may be implemented automatically responsive to detection of an object in the turning alert zone ZZ. For example, if a person is detected in the turning alert zone ZZ, the turning alert zone module 117 may control operation of the vehicle 100 in a manner directed to preventing a collision between the vehicle and the object by controlling operation of an output system of the vehicle to generate an alert directed to the person. The alert may be configured to be audible and/or visible to the person detected in the alert zone. In another example, the turning alert zone module 117 may control operation of the vehicle in a manner directed to preventing a collision between the vehicle and the object by automatically controlling operation of an output system of the vehicle to generate an alert directed to an occupant of the vehicle. This may enable the vehicle occupant to apply brakes to stop the vehicle or to turn in another direction to avoid the object determined to reside in the turning alert zone. In another aspect, the turning alert zone module 117 may control operation of the vehicle (or may operate in conjunction with the autonomous driving module 160 to control operation of the vehicle) to apply the brakes or to change the turning direction of the vehicle to avoid colliding with the object.

In another aspect, the turning alert zone module 117 may control operation of the vehicle in a manner directed to preventing a collision between the vehicle and the object by controlling operation of an output system of the vehicle to display representations of the turning alert zone in which the at least a portion of an object resides and the at least a portion of the object residing in the turning alert zone. This display may provide further information to enable a driver of the vehicle to stop the vehicle or evade the object.

In a particular aspect, the object residing in the turning alert zone may be a curb having a curb height above a predetermined threshold. The turning alert zone module 117 may control operation of the vehicle in a manner directed to preventing a collision between the vehicle and the object by controlling operation of the braking system to brake the vehicle so as to stop the vehicle before the vehicle contacts the curb. This may prevent damage to the vehicle in cases where the curb has a height too large for the vehicle to traverse, or too large for the vehicle to traverse at the existing turning speed. In one or more particular arrangements, the predetermined threshold curb height may be six inches.

Any of the alerts described herein may be in any suitable form, such as audible, visual, tactile or a combination of these. Following generation of the at least a first alert, additional alerts may be generated if the first alert is not acknowledged. Successive alerts may increase in intensity and involve the transmission of messages via a wide variety of media, and to a wide variety of recipients. Any alerts generated may include a request for response or acknowledgement of receipt of the alert by the recipient.

Figure 3:
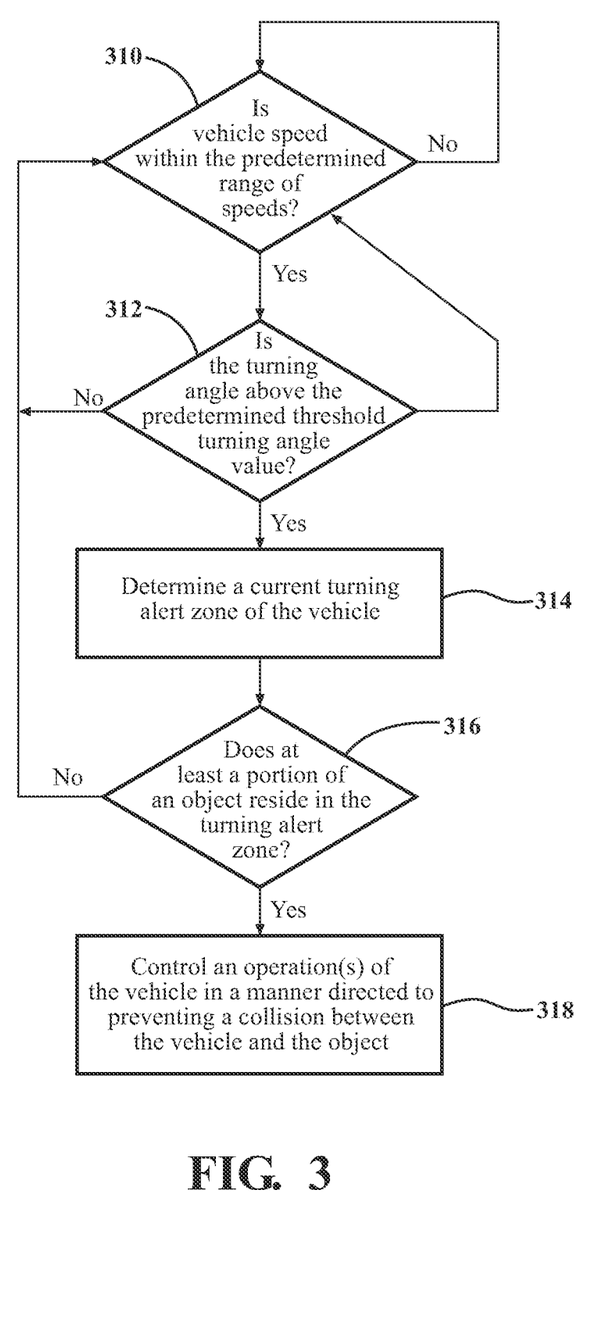
FIG. 3 is a flow diagram illustrating operations of a system for controlling one or more operations of a vehicle during a turning operation of the vehicle, in accordance with embodiments described herein.

FIG. 3 is a flow diagram illustrating operations of a system (including an embodiment of the turning alert zone module 117) for controlling one or more operations of a vehicle during a turning operation of the vehicle. Referring to FIG. 3, the turning alert zone module 117 may (in block 310) determine if a speed of the vehicle is within the predetermined range of speeds. If the vehicle speed is not within the predetermined range of speeds at which a turning maneuver may be implemented, the turning alert zone module 117 may continue to monitor the vehicle speed. However, if the vehicle speed is within the predetermined range of speeds at which a turning maneuver may be implemented, the turning alert zone module 117 may (in block 312) determine if the vehicle turning angle θ is above the predetermined threshold value.

If the vehicle turning angle is not above the predetermined threshold value, control may transfer back to block 310, where the turning alert zone module may re-determine if the vehicle speed is within the predetermined range of speeds at which a turning maneuver may be implemented. However, if the vehicle turning angle is above the predetermined threshold value, the turning alert zone module 117 may (in block 314) determine a current turning alert zone ZZ of the vehicle. The turning alert zone module 117 may then (in block 316) determine if at least a portion of an object resides in the current turning alert zone ZZ.

If at least a portion of an object does not reside in the current turning alert zone ZZ, control may transfer back to block 310 where the turning alert zone module 117 may re-determine if the vehicle speed is still within the predetermined range of speeds at which a turning maneuver may be implemented, after which blocks 312 and 314 may be repeated if the vehicle is still turning, to determine a new current turning alert zone (i.e., to update the turning alert zone for a later point in the turning maneuver). However, if (in block 316) at least a portion of an object resides in the current turning alert zone, the turning alert zone module 117 may control operation of the vehicle in a manner directed to preventing a collision between the vehicle 100 and the object. Control of one or more operations of the vehicle may be performed in a manner previously described or in another manner.

The operations of blocks 310-316 may continue to cycle while the vehicle is turning, at the maximum rate commensurate with the sensor data acquisition and processing operations needed to determine updated turning alert zones and determine if any objects reside in the current turning alert zone.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-3, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module, as envisioned by the present disclosure, is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for controlling operation of a vehicle, the system comprising:
   an object detection sensor; a vehicle turning angle sensor; a processor; and
   a memory communicably coupled to the processor and storing a turning alert zone module including computer-readable instructions that, when executed by the processor, cause the processor to:
   determine if a speed of the vehicle is within a predetermined range of speeds:
   if the speed of the vehicle is within the predetermined range of speeds, determine if a vehicle turning angle is above a predetermined threshold value;
   if the turning angle is above the predetermined threshold value, using the turning angle, determine a turning alert zone including a first turning alert sub-zone and a second turning alert sub-zone contiguous with the first turning alert sub-zone;
   determine if at least a portion of an object resides in the turning alert zone; and
   if at least a portion of an object resides in the turning alert zone, control an operation of the vehicle.

2. The system according to claim 1, wherein the at least a portion of an object residing in the turning alert zone is at least a portion of a person, and wherein the turning alert zone module further includes computer-readable instructions that, when executed by the processor, cause the processor to automatically control operation of an output system of the vehicle to generate an alert directed to the person.

3. The system according to claim 2, wherein the turning alert zone module further includes computer-readable instructions that, when executed by the processor, cause the processor to automatically control operation of an output system of the vehicle to display representations of:
   the turning alert zone in which the at least a portion of an object resides; and
   the at least a portion of an object residing in the turning alert zone.

4. The system according to claim 1, wherein the turning alert zone module further includes computer-readable instructions that, when executed by the processor, cause the processor to automatically control operation of a braking system of the vehicle to brake the vehicle so as to stop the vehicle before the vehicle collides with the object.

5. The system of claim 4, wherein an object residing in the turning alert zone is a curb having a curb height above a predetermined threshold, and wherein the turning alert zone module further includes computer-readable instructions that, when executed by the processor, cause the processor to automatically control operation of the braking system to brake the vehicle so as to stop the vehicle before the vehicle contacts the curb.

6. The system according to claim 4, wherein the turning alert zone module further includes computer-readable instructions that, when executed by the processor, cause the processor to discontinue automatic control of the braking system responsive to a determination that the braking system is being operated by a driver of the vehicle.

7. The system according to claim 1, wherein the turning alert zone module further includes computer-readable instructions that, when executed by the processor, cause the processor to automatically control operation of an output system of the vehicle to generate an alert directed to an occupant of the vehicle.

8. The system of claim 1, wherein the turning alert zone is partially defined by an arc intersecting an inside front wheel face plane of an inside front wheel of the vehicle, with the inside front wheel face plane being tangent to the arc, when the turning angle is above the predetermined threshold value.

9. A computer-implemented method for controlling operation of a vehicle during a turning operation of the vehicle, the method comprising steps of:
   determining that a speed of the vehicle is within a predetermined range of speeds:
   determining that a vehicle turning angle is above a predetermined threshold value;

using the turning angle, determining a turning alert zone by defining a first turning alert sub-zone, defining a second turning alert sub-zone contiguous with the first turning alert sub-zone, and combining the first and second turning alert sub-zones;

determining that at least a portion of an object resides in the turning alert zone; and responsive to at least a portion of an object residing in the turning alert zone, controlling operation of the vehicle in a manner directed to preventing a collision between the vehicle and the object.

10. The method of claim 9, wherein the at least a portion of an object residing in the turning alert zone is at least a portion of a person, and wherein the step of controlling operation of the vehicle includes a step of automatically controlling operation of an output system of the vehicle to generate an alert directed to the person.

11. The method of claim 9, wherein the step of controlling operation of the vehicle includes a step of automatically controlling operation of an output system of the vehicle to display representations of:

the turning alert zone in which the at least a portion of an object resides; and the at least a portion of the object residing in the turning alert zone.

12. The method of claim 9, wherein the step of controlling operation of the vehicle includes a step of automatically controlling operation of a braking system of the vehicle to brake the vehicle so as to stop the vehicle before the vehicle collides with the object.

13. The method of claim 12, wherein an object residing in the turning alert zone is a curb having a curb height above a predetermined threshold, and wherein the step of controlling operation of the vehicle includes a step of automatically control operation of the braking system to brake the vehicle so as to stop the vehicle before the vehicle contacts the curb.

14. The method of claim 12, further comprising the step of discontinuing automatic control of the braking system responsive to a determination that the braking system is being operated by a driver of the vehicle.

15. The method of claim 9, wherein the step of controlling operation of the vehicle includes a step of automatically controlling operation of an output system of the vehicle to generate an alert directed to an occupant of the vehicle.

16. A non-transitory computer-readable medium for controlling operation of a vehicle during a turning operation of the vehicle and storing instructions that when executed by one or more processors cause the one or more processors to:

determine that a speed of the vehicle is within a predetermined range of speeds:

determine that a vehicle turning angle is above a predetermined threshold value;

using the turning angle, determine a turning alert zone including a first turning alert sub-zone and a second turning alert sub-zone contiguous with the first turning alert sub-zone;

determine that at least a portion of an object resides in the turning alert zone; and responsive to at least a portion of an object residing in the turning alert zone, control operation of the vehicle in a manner directed to preventing a collision between the vehicle and the object.

17. The non-transitory computer-readable medium of claim 16 storing further instructions that when executed by one or more processors cause the one or more processors to automatically control operation of a braking system of the vehicle to brake the vehicle so as to stop the vehicle before the vehicle collides with the object.

18. The non-transitory computer-readable medium of claim 17 storing further instructions that when executed by one or more processors cause the one or more processors to discontinue automatic control of the braking system responsive to a determination that the braking system is being operated by a driver of the vehicle.

19. The non-transitory computer-readable medium of claim 17 wherein an object residing in the turning alert zone is a curb having a curb height above a predetermined threshold, and wherein the computer-readable medium stores further instructions that when executed by one or more processors cause the one or more processors to automatically control operation of the braking system to brake the vehicle so as to stop the vehicle before the vehicle contacts the curb.

20. The non-transitory computer-readable medium of claim 17 wherein the at least a portion of an object residing in the turning alert zone is at least a portion of a person, and wherein the computer-readable medium stores further instructions that when executed by one or more processors cause the one or more processors to automatically control operation of an output system of the vehicle to generate an alert directed to the person.

21. The non-transitory computer-readable medium of claim 16 storing further instructions that when executed by one or more processors cause the one or more processors to automatically control operation of an output system of the vehicle to generate an alert directed to an occupant of the vehicle.

* * * * *